United States Patent [19]
O'Brien

[11] Patent Number: 4,484,104
[45] Date of Patent: Nov. 20, 1984

[54] SOLAR-POWERED LIGHTING SYSTEM

[76] Inventor: Peter O'Brien, 7 Wilga Grove, Ashmore Village, Southport, Australia

[21] Appl. No.: 387,837
[22] PCT Filed: Oct. 6, 1980
[86] PCT No.: PCT/AU80/00075
§ 371 Date: Jun. 1, 1982
§ 102(e) Date: Jun. 1, 1982
[87] PCT Pub. No.: WO82/01270
PCT Pub. Date: Apr. 15, 1982
[51] Int. Cl.³ .......... H02P 3/00
[52] U.S. Cl. .......... 315/86; 136/291; 315/149; 315/307; 362/812
[58] Field of Search .......... 315/86, 307, 149; 136/291; 362/812

[56] References Cited

U.S. PATENT DOCUMENTS

| | | | |
|---|---|---|---|
| 1,003,724 | 9/1911 | Felver | 315/812 |
| 3,486,068 | 12/1969 | Dunn et al. | 315/86 |
| 3,739,226 | 6/1973 | Seiter et al. | 315/86 |
| 3,860,863 | 1/1975 | Lamprecht | 136/291 |
| 4,009,051 | 2/1977 | Kazis et al. | 136/291 |
| 4,009,535 | 3/1977 | Stock | 136/291 |
| 4,283,657 | 8/1981 | Gordon et al. | 315/86 |
| 4,314,198 | 2/1982 | Rogers | 315/360 |
| 4,384,317 | 5/1983 | Stackpole | 362/812 |

FOREIGN PATENT DOCUMENTS 1056445 6/1979 Canada .

OTHER PUBLICATIONS

"Solar Panel for Terrestrial Applications" by Franx Electronic Component & Applications, vol. 1, Part VI, Feb. 1979, pp. 109–124.

Conference Record of IEEE Photovoltaic Specialist Conference 1978 "Description . . . Photovoltaic Experiment" by Ratajczak, pp. 1272–1277.

*Primary Examiner*—Harold Dixon
*Attorney, Agent, or Firm*—D. Paul Weaver

[57] ABSTRACT

A solar-powered lighting system suitable for signs or hoardings (10), navigation beacons or as an emergency supply for hotels, cinemas, hospitals or other services. The system incorporates solar cell arrays (17) which generate electricity which is stored in batteries (22). A sensing circuit (14) selectively connects the batteries (22) to lights (14). A timing/switching circuit (32), (**32*a*) may be provided to selectively connect the lights (14) to a mains supply (30**).

18 Claims, 4 Drawing Figures

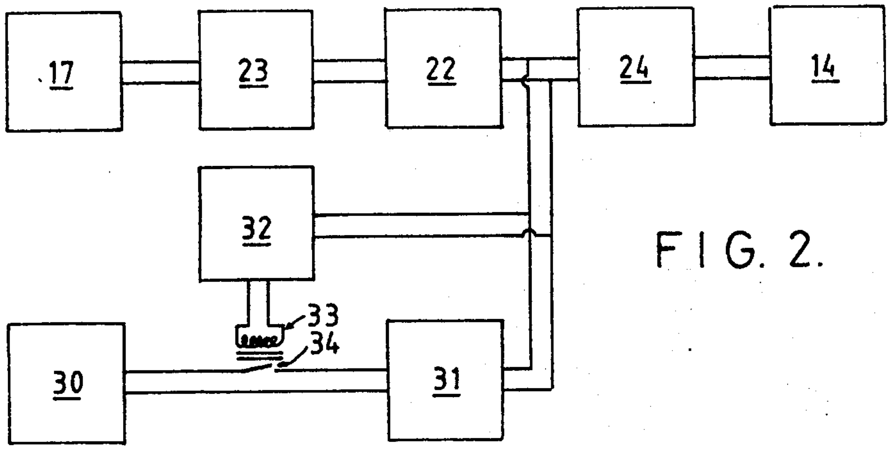
FIG. 2.
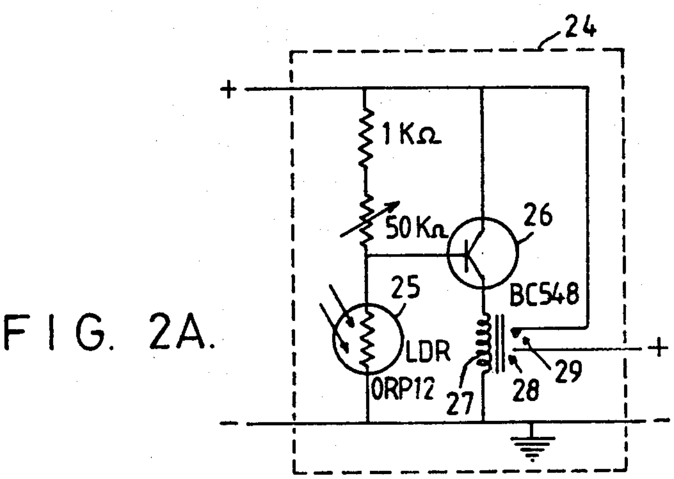
FIG. 2A.
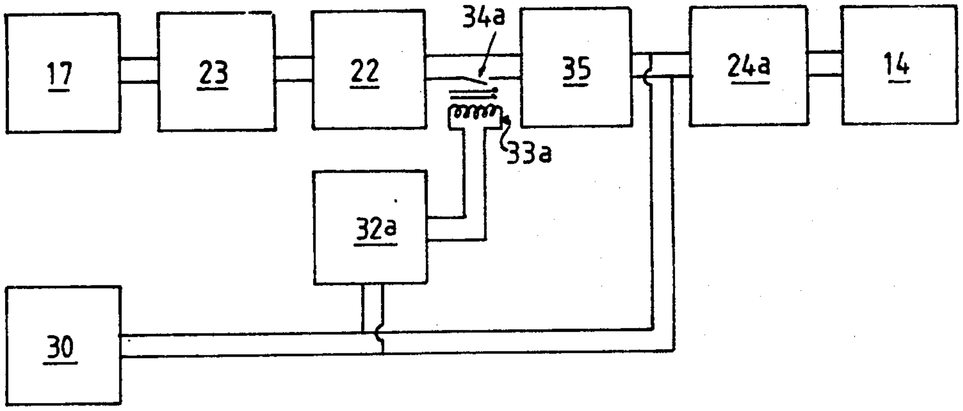

SOLAR-POWERED LIGHTING SYSTEM

This invention relates to a solar powered lighting system, suitable for illuminated signs, billboards and hoardings powered by the system which may be used for advertising purposes.

Roadside billboards are well-known and are a common sight along the sides of highways or major roads, being either free-standing or mounted on walls or building structures. While they are an effective advertising medium during daylight hours, their effectiveness is almost zero at night unless some method of illumination is provided. In remote locations, or along highways, it is often not economically feasible to supply electricity to these billboards to enable them to be illuminated.

In cities or towns, where an electricity supply is available, the illumination of the billboards and hoardings may be direct, e.g. by lights mounted in front of the billboards or hoardings with their light directed thereonto, by neon tubes or fluorescent tubes formed into particular shapes or configurations, or indirectly, by illuminating the rear of the panels carrying the materials, where the panels may be selectively transparent or opaque.

It is an object of the present invention to provide a solar-powered lighting system.

It is a preferred object of the present invention to provide an illuminated sign, billboard or hoarding which has an integral power supply which provides electricity generation by way of solar cells.

It is a preferred object of the present invention to provide means to selectively illuminate the lights of the sign, billboard or hoarding when visibility is below a preset minimum and/or for a predetermined time period.

It is a further preferred object to provide a power supply which, with minor modification, can be used with either A.C. or D.C. lights.

It is a still further preferred object to provide a power supply which may be used in conjunction with a main electricity supply, the present invention providing an emergency or "back-up" supply.

Other preferred objects of the present invention will become apparent from the following description.

In the broad aspect, the present invention resides in a solar-powered lighting system for illuminated signs and hoardings including:

a plurality of solar cells arranged in an array to receive solar energy;

battery means to store electrical energy generated by the solar cells;

light means operable by the electrical energy; characterized by:

sensing means operable to control the illumination of the light means dependent on the light intensity in the vicinity of the sign or hoarding.

Preferably the sensing means is interposed between the battery means and the light means and includes a light sensitive component which switches on the light means when the light intensity falls below a preset minimum value.

In one preferred form, the sensing means includes:

a light sensitive resistor;

a transistor biassed by said resistor;

a relay connected to the transistor, the relay being normally open isolating the light means from the battery means;

the components being arranged so that when the light intensity incident on said resistor falls below the present minimum value, the transistor is switched to operate the relay to interconnect the light means to the battery means to illuminate the sign.

In an alternative form, the sensing means includes:

a photovoltaic cell;

a silicon-controlled rectifier having its gate connected to the output of the photovoltaic cell; and a relay connected to the rectifier and normally open isolating the light means from the battery means;

the components being arranged so that when the light intensity incident on the photovoltaic cell falls below the preset minimum value, the rectifier is switched to close the relay to interconnect the light means to the battery means to illuminate the sign.

Preferably a battery voltage regulator is provided between the solar cell array and the battery to regulate the voltage and current generated by the solar cell array.

A timing means, e.g. a time clock, may be provided to cause the sign to be illuminated for a predetermined period or periods daily.

The lights may be of either the direct current (D.C.) or alternating current (A.C.) type. Where an alternating current mains supply is connected to the sign, a switching circuit may be provided to switch either the mains supply or the solar electricity supply into connection with the lamps. For example, where the sign is normally supplied by the mains supply, the solar electricity supply could be provided as a back-up supply to maintain the sign illuminated should the mains supply fail or be interrupted. Where restrictions prevent continual mains supply to the sign, the solar electricity supply can also maintain the sign illuminated.

Preferably the light means includes a plurality of electric lamps mounted in a housing behind a display panel and operable to back-light the panel. The lamps may be, e.g. incandescent lamps, fluorescent tubes or neon lamps. Alternatively, the light can be positioned in front of the panel to directly illuminate it or the lamps can be shaped into any desired configuration, e.g. as a neon sign.

Preferably the solar array includes a plurality of solar cell modules mounted on or adjacent the housing, the modules being electrically interconnected to provide the desired voltage/current/power requirements for the sign. Preferably the modules are adjustably mounted so that they can be accurately positioned on site to receive the maximum quantity of solar energy during each day.

To enable the invention to be fully understood, preferred embodiments will now be described with reference to the accompanying drawings, in which:

FIG. 2 is a block diagram of the circuit for one embodiment of the invention;

FIG. 2A is the circuit of the light-sensitive switch used in the circuit of FIG. 2; and FIG. 3 is a block diagram of the circuit of a second embodiment of the invention.

Figure 1:
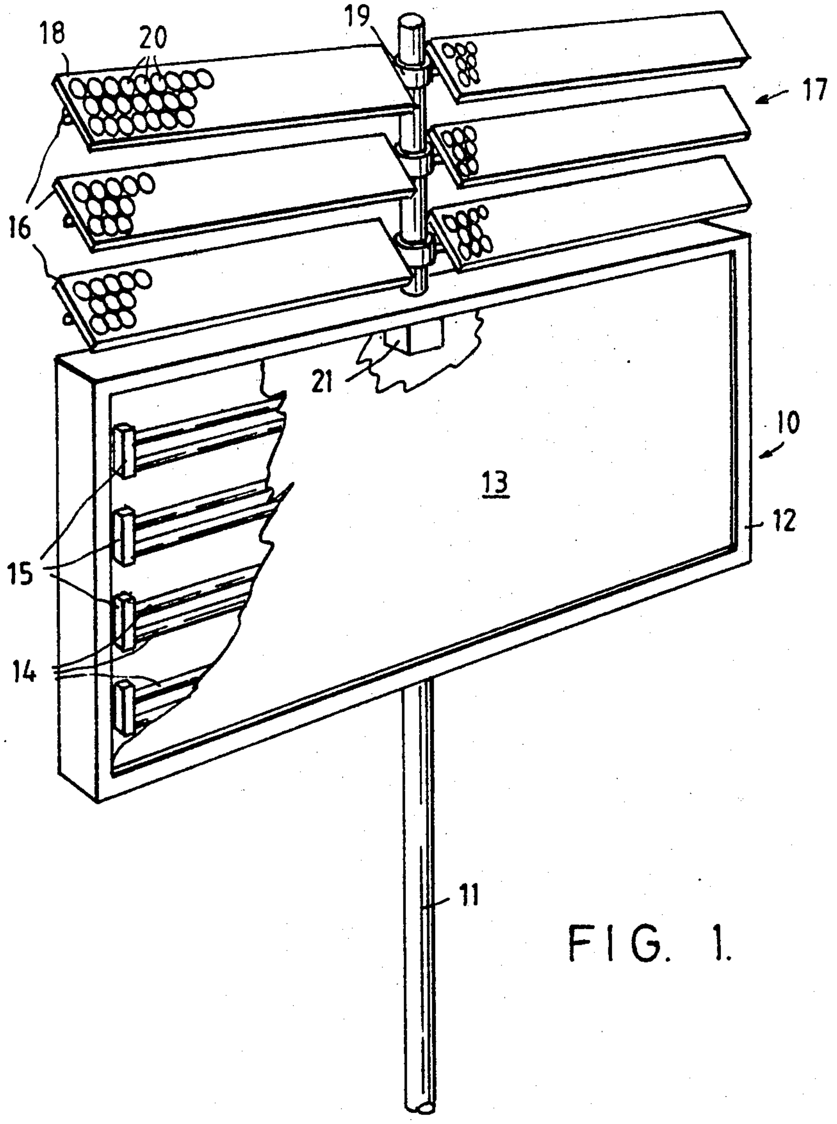
FIG. 1 is a front perspective view of a sign.

Referring to FIG. 1, illuminated sign 10 is mounted on a post 11 and has a substantially rectangular housing 12 formed by an open-fronted sheet metal box. The front of the housing is closed by an advertising panel 13 formed of toughened or laminated glass, polycarbonate sheet or other suitable material. Portions of the panel are either transparent or opaque to form the advertising message to be conveyed to the potentiol customer.

A plurality of fluorescent lights 14 are mounted inside the housing 12 in suitable electrical sockets 15. When illuminated, the lights 14 provide back-lighting for the advertising panel 13.

Six solar cell modules 16 are mounted on the upper end of the post 11 in a three-by-two (3×2) array 17. Each module 16 has a frame supported on adjustable brackets 19 secured to the post 11. By tilting adjustment of the modules, and rotation about the post so that the modules face North in the Southern Hemisphere (or South in the Northern Hemisphere), the maximum quantity of solar energy can fall onto the array.

The solar cells 20 in each module 16 are interconnected and the modules are, in turn, interconnected in either series or parallel depending on the voltage/current/power characteristics required.

The electricity generated by the array is fed to an electronics "black box" 21 mounted on the housing 12. FIG. 2 shows a circuit for a sign having direct current (D.C.) lamps 14.

The electrical output from the solar array 17 is fed to one or more electricity storage batteries 22 via a battery voltage regulator 23 with known voltage and current characteristics.

The electricity supply from the battery 22 to the lights 14 is controlled by a sensing circuit 24 which switches on the lights 14 when the light intensity in the vicinity of the sign falls below a preset value.

Referring to FIG. 2A, the sensing circuit 24 incorporates a light-sensitive resistor 25 in the biassing circuit of a switching transitor 26. The coil 27 of a normally open relay 28 (having contact points 29) is provided between the emitter of the transistor 26 and ground (or earth). As the light intensity incident on the resistor 25 decreases, the resistance of the resistor 25 increases and so the base-emitter voltage (VBE) of the transistor 26 is increased. At a preset voltage, the transistor 26 is switched on to cause current to flow through the coil 27 to close contact points 29. The lights 14 are now connected to the battery 22 and the sign 10 is illuminated. When the light intensity in the vicinity of the sign reaches a preset minimum value, i.e. just after dawn, the resistance of the resistor 25 drops, switching off the lights 14.

If cloud cover reduces the visibility of the sign, the lights 14 will be switched on and the sign will not lose the impact of its message.

In some applications, a mains electricity supply 30 (with an alternating current) may be available. The supply 30 is connected to the battery 22 via a suitable rectifier 31 having a direct current (D.C.) output. Should the mains supply 30 fail or be interrupted, the lights 14 will continue to operate on the electricity stored in the battery 22 generated by the solar array 17.

If preferred, a timing circuit 32 may be provided, powered by the battery 22 or rectifier 31, which is connected to a relay 33 which operates a switch 34 in the mains supply circuit. By this arrangement, the mains supply 30 can be switched off or on as desired to power the sign for a predetermined period, or periods, each day.

As an alternative, the timing circuit 32 may be combined with the sensing circuit 24 so that the lights 14 are only switched on to illuminate the sign 10 during preset time periods and when the visibility of the unilluminated sign is low.

FIG. 3 shows a circuit for a sign having alternatting current (A.C.) lights 14.

The output of the battery 22 is fed through a D.C./A.C. inverter 35 to the sensing circuit 24*a*, to which the mains supply 30 is also connected.

A timing circuit 32*a* is connected to the mains supply 30 and operates a relay 33*a* to connect the battery 22 to the lights 14 via switch 34*a*.

As an alternative, where the solar array 17 provides a back-up supply to the mains supply 30, the timing circuit 32*a* may be replaced by a circuit which is operated when the mains supply 30 is interrupted or fails, enabling the sign to remain illuminated. Therefore this arrangement is also particularly suitable for warning lights or beacons which must be kept illuminated at all times.

The sensing circuit 24*a* may include a circuit similar to the sensing circuit 24 (FIG. 2A) or may include a photovoltaic cell which has its output connected to the gate of a silicon-controlled-rectifier (SCR) which, in turn, controls a relay 28. When the light intensity on the photovoltaic cell falls below a preset minimum value, the SCR operates the relay to switch on the lights 14.

From the above, it can be easily seen that the solar array 17 may provide the main supply or an auxiliary supply for the lights 14 and may be invaluable as an emergency back-up supply for signs, lights or beacons which must be kept illuminated at all times, or in hotels, cinemas, hospitals or other service buildings.

Various changes and modifications may be made to the embodiments or alternatives thereon hereinbefore described without departing from the scope of the present invention.

I claim:

1. A solar-powered lighting system for illuminated signs and hoardings including:

a plurality of solar cells (20) arranged in an array (17) to receive solar energy;

battery means (22) to store electrical energy generated by the solar cells (20);

light means (14) operable by the electrical energy;

timing means (32) operable to cause the sign (10) to be illuminated for a predetermined period;

a direct current/alternating current inverter interposed between said battery means (22) and said light means (14);

an alternating current mains electricity supply (30) connected to said light means (14);

a switch (32*a*) operable by said mains supply to connect said battery mean (22) to said light means (14) for a predetermined period or when said mains supply (30) is switched off; and sensing means (24) operable to control the illumination of said light means (14) dependent on the light intensity in the vicinity of the sign or hoarding (10).

2. A system as claimed in claim 1 further characterized in that:

said sensing means (24) is interposed between said battery means (22) and said light means (14) and includes a light-sensitive component (25) operable to illuminate said light means (14) when the light intensity falls below a preset minimum value.

3. A system as claimed in claim 2 wherein said sensing means (24) includes:

a light sensitive resistor (25);

a transistor (26) biased by said resistor; and

SOLAR-POWERED LIGHTING SYSTEM

This invention relates to a solar powered lighting system, suitable for illuminated signs, billboards and hoardings powered by the system which may be used for advertising purposes.

Roadside billboards are well-known and are a common sight along the sides of highways or major roads, being either free-standing or mounted on walls or building structures. While they are an effective advertising medium during daylight hours, their effectiveness is almost zero at night unless some method of illumination is provided. In remote locations, or along highways, it is often not economically feasible to supply electricity to these billboards to enable them to be illuminated.

In cities or towns, where an electricity supply is available, the illumination of the billboards and hoardings may be direct, e.g. by lights mounted in front of the billboards or hoardings with their light directed thereonto, by neon tubes or fluorescent tubes formed into particular shapes or configurations, or indirectly, by illuminating the rear of the panels carrying the materials, where the panels may be selectively transparent or opaque.

It is an object of the present invention to provide a solar-powered lighting system.

It is a preferred object of the present invention to provide an illuminated sign, billboard or hoarding which has an integral power supply which provides electricity generation by way of solar cells.

It is a preferred object of the present invention to provide means to selectively illuminate the lights of the sign, billboard or hoarding when visibility is below a preset minimum and/or for a predetermined time period.

It is a further preferred object to provide a power supply which, with minor modification, can be used with either A.C. or D.C. lights.

It is a still further preferred object to provide a power supply which may be used in conjunction with a main electricity supply, the present invention providing an emergency or "back-up" supply.

Other preferred objects of the present invention will become apparent from the following description.

In the broad aspect, the present invention resides in a solar-powered lighting system for illuminated signs and hoardings including:

a plurality of solar cells arranged in an array to receive solar energy;

battery means to store electrical energy generated by the solar cells;

light means operable by the electrical energy; characterized by:

sensing means operable to control the illumination of the light means dependent on the light intensity in the vicinity of the sign or hoarding.

Preferably the sensing means is interposed between the battery means and the light means and includes a light sensitive component which switches on the light means when the light intensity falls below a preset minimum value.

In one preferred form, the sensing means includes:

a light sensitive resistor;

a transistor biassed by said resistor;

a relay connected to the transistor, the relay being normally open isolating the light means from the battery means;

the components being arranged so that when the light intensity incident on said resistor falls below the present minimum value, the transistor is switched to operate the relay to interconnect the light means to the battery means to illuminate the sign.

In an alternative form, the sensing means includes:

a photovoltaic cell;

a silicon-controlled rectifier having its gate connected to the output of the photovoltaic cell; and a relay connected to the rectifier and normally open isolating the light means from the battery means;

the components being arranged so that when the light intensity incident on the photovoltaic cell falls below the preset minimum value, the rectifier is switched to close the relay to interconnect the light means to the battery means to illuminate the sign.

Preferably a battery voltage regulator is provided between the solar cell array and the battery to regulate the voltage and current generated by the solar cell array.

A timing means, e.g. a time clock, may be provided to cause the sign to be illuminated for a predetermined period or periods daily.

The lights may be of either the direct current (D.C.) or alternating current (A.C.) type. Where an alternating current mains supply is connected to the sign, a switching circuit may be provided to switch either the mains supply or the solar electricity supply into connection with the lamps. For example, where the sign is normally supplied by the mains supply, the solar electricity supply could be provided as a back-up supply to maintain the sign illuminated should the mains supply fail or be interrupted. Where restrictions prevent continual mains supply to the sign, the solar electricity supply can also maintain the sign illuminated.

Preferably the light means includes a plurality of electric lamps mounted in a housing behind a display panel and operable to back-light the panel. The lamps may be, e.g. incandescent lamps, fluorescent tubes or neon lamps. Alternatively, the light can be positioned in front of the panel to directly illuminate it or the lamps can be shaped into any desired configuration, e.g. as a neon sign.

Preferably the solar array includes a plurality of solar cell modules mounted on or adjacent the housing, the modules being electrically interconnected to provide the desired voltage/current/power requirements for the sign. Preferably the modules are adjustably mounted so that they can be accurately positioned on site to receive the maximum quantity of solar energy during each day.

To enable the invention to be fully understood, preferred embodiments will now be described with reference to the accompanying drawings, in which:

FIG. 1 is a front perspective view of a sign;

FIG. 2 is a block diagram of the circuit for one embodiment of the invention;

FIG. 2A is the circuit of the light-sensitive switch used in the circuit of FIG. 2; and FIG. 3 is a block diagram of the circuit of a second embodiment of the invention.

Referring to FIG. 1, illuminated sign 10 is mounted on a post 11 and has a substantially rectangular housing 12 formed by an open-fronted sheet metal box. The front of the housing is closed by an advertising panel 13 formed of toughened or laminated glass, polycarbonate sheet or other suitable material. Portions of the panel are either transparent or opaque to form the advertising message to be conveyed to the potentiol customer.

A plurality of fluorescent lights 14 are mounted inside the housing 12 in suitable electrical sockets 15. When illuminated, the lights 14 provide back-lighting for the advertising panel 13.

Six solar cell modules 16 are mounted on the upper end of the post 11 in a three-by-two (3×2) array 17. Each module 16 has a frame supported on adjustable brackets 19 secured to the post 11. By tilting adjustment of the modules, and rotation about the post so that the modules face North in the Southern Hemisphere (or South in the Northern Hemisphere), the maximum quantity of solar energy can fall onto the array.

The solar cells 20 in each module 16 are interconnected and the modules are, in turn, interconnected in either series or parallel depending on the voltage/current/power characteristics required.

The electricity generated by the array is fed to an electronics "black box" 21 mounted on the housing 12. FIG. 2 shows a circuit for a sign having direct current (D.C.) lamps 14.

The electrical output from the solar array 17 is fed to one or more electricity storage batteries 22 via a battery voltage regulator 23 with known voltage and current characteristics.

The electricity supply from the battery 22 to the lights 14 is controlled by a sensing circuit 24 which switches on the lights 14 when the light intensity in the vicinity of the sign falls below a preset value.

Referring to FIG. 2A, the sensing circuit 24 incorporates a light-sensitive resistor 25 in the biassing circuit of a switching transitor 26. The coil 27 of a normally open relay 28 (having contact points 29) is provided between the emitter of the transistor 26 and ground (or earth). As the light intensity incident on the resistor 25 decreases, the resistance of the resistor 25 increases and so the base-emitter voltage (VBE) of the transistor 26 is increased. At a preset voltage, the transistor 26 is switched on to cause current to flow through the coil 27 to close contact points 29. The lights 14 are now connected to the battery 22 and the sign 10 is illuminated. When the light intensity in the vicinity of the sign reaches a preset minimum value, i.e. just after dawn, the resistance of the resistor 25 drops, switching off the lights 14.

If cloud cover reduces the visibility of the sign, the lights 14 will be switched on and the sign will not lose the impact of its message.

In some applications, a mains electricity supply 30 (with an alternating current) may be available. The supply 30 is connected to the battery 22 via a suitable rectifier 31 having a direct current (D.C.) output. Should the mains supply 30 fail or be interrupted, the lights 14 will continue to operate on the electricity stored in the battery 22 generated by the solar array 17.

If preferred, a timing circuit 32 may be provided, powered by the battery 22 or rectifier 31, which is connected to a relay 33 which operates a switch 34 in the mains supply circuit. By this arrangement, the mains supply 30 can be switched off or on as desired to power the sign for a predetermined period, or periods, each day.

As an alternative, the timing circuit 32 may be combined with the sensing circuit 24 so that the lights 14 are only switched on to illuminate the sign 10 during preset time periods and when the visibility of the unilluminated sign is low.

FIG. 3 shows a circuit for a sign having alternatting current (A.C.) lights 14.

The output of the battery 22 is fed through a D.C./A.C. inverter 35 to the sensing circuit **24*a*, to which the mains supply 30** is also connected.

A timing circuit **32*a* is connected to the mains supply 30 and operates a relay 33*a* to connect the battery 22 to the lights 14 via switch 34*a***.

As an alternative, where the solar array 17 provides a back-up supply to the mains supply 30, the timing circuit **32*a* may be replaced by a circuit which is operated when the mains supply 30** is interrupted or fails, enabling the sign to remain illuminated. Therefore this arrangement is also particularly suitable for warning lights or beacons which must be kept illuminated at all times.

The sensing circuit **24*a* may include a circuit similar to the sensing circuit 24 (FIG. 2A) or may include a photovoltaic cell which has its output connected to the gate of a silicon-controlled-rectifier (SCR) which, in turn, controls a relay 28. When the light intensity on the photovoltaic cell falls below a preset minimum value, the SCR operates the relay to switch on the lights 14**.

From the above, it can be easily seen that the solar array 17 may provide the main supply or an auxiliary supply for the lights 14 and may be invaluable as an emergency back-up supply for signs, lights or beacons which must be kept illuminated at all times, or in hotels, cinemas, hospitals or other service buildings.

Various changes and modifications may be made to the embodiments or alternatives thereon hereinbefore described without departing from the scope of the present invention.

I claim:

1. A solar-powered lighting system for illuminated signs and hoardings including:

a plurality of solar cells (20) arranged in an array (17) to receive solar energy;

battery means (22) to store electrical energy generated by the solar cells (20);

light means (14) operable by the electrical energy;

timing means (32) operable to cause the sign (10) to be illuminated for a predetermined period;

a direct current/alternating current inverter interposed between said battery means (22) and said light means (14);

an alternating current mains electricity supply (30) connected to said light means (14);

a switch **(32*a*) operable by said mains supply to connect said battery mean (22) to said light means (14) for a predetermined period or when said mains supply (30) is switched off; and sensing means (24) operable to control the illumination of said light means (14) dependent on the light intensity in the vicinity of the sign or hoarding (10)**.

2. A system as claimed in claim 1 further characterized in that:

said sensing means (24) is interposed between said battery means (22) and said light means (14) and includes a light-sensitive component (25) operable to illuminate said light means (14) when the light intensity falls below a preset minimum value.

3. A system as claimed in claim 2 wherein said sensing means (24) includes:

a light sensitive resistor (25);

a transistor (26) biased by said resistor; and a relay (27) connected to the transistor (26), said relay (27) being normally open isolating said light means (14) from said battery means (22);

the components being arranged so that when the light intensity incident on said resistor (25) falls below the preset minimum value, said transistor (26) is switched to operate said relay (27) to interconnect said light means (14) to said battery means (22) to illuminate the sign or hoarding (10).

4. A system as claimed in claim 2 wherein the sensing means includes:

a photovoltaic cell;

a silicon-controlled-rectifier having its gate connected to the output of the photovoltaic cell; and a relay connected to said rectifier and normally open isolating the light means from the battery means;

the components being arranged so that when the light intensity incident on said photovoltaic cell falls below the present minimum value, said rectifier is switched to close said relay to interconnect said light means to said battery means to illuminate the sign.

5. A system as claimed in claim 1, further including:

a battery voltage regulator (23) controlling the electrical voltage and current generated by said solar cell array (17).

6. A system as claimed in claim 1 wherein said predetermined period for which said timing means (32) is operable to cause the sign (10) to be illuminated is comprised of a plurality of daily periods.

7. A direct current system as claimed in claim 6, further including:

an alternating current mains electricity supply (30);

a rectifier (31) connecting the mains supply (30) to said battery means (22); and switch means operable by said timing means (32) to cause said mains supply (30) to supply electricity to the sign (10) for a predetermined period.

8. A system as claimed in claim 1 wherein:

said light means (14) includes a plurality of electric lamps (14) mounted in a housing (12) behind a display panel (13) operable to back-light said panel (13); and said solar cell array (17) includes a plurality of solar cell modules (16) mounted on said housing (12) and electrically interconnected to generate electricity to operate said lamps (14).

9. A system as claimed in claim 2, further including:

a battery voltage regulator (23) controlling the electrical voltage and current generated by said solar cell array (17).

10. A system as claimed in claim 3, further including:

a battery voltage regulator (23) controlling the electrical voltage and current generated by said solar cell array (17).

11. A system as claimed in claim 4, further including:

a battery voltage regulator (23) controlling the electrical voltage and current generated by said solar cell array (17).

12. A system as claimed in claim 2 wherein said predetermined period for which said timing means (32) is operable to cause the sign (10) to be illuminated is comprised of a plurality of daily periods.

13. A system as claimed in claim 3 wherein said predetermined period for which said timing means (32) is operable to cause the sign (10) to be illuminated is comprised of a plurality of daily periods.

14. A system as claimed in claim 4 wherein said predetermined period for which said timing means (32) is operable to cause the sign (10) to be illuminated is comprised of a plurality of daily periods.

15. A direct current system as claimed in claim 6, further including:

an alternating current mains electricity supply (30);

a rectifier (31) connecting the mains supply (30) to said battery means (22); and switch means operable by said timing means (32) to cause said mains supply (30) to supply electricity to the sign (10) for predetermined periods.

16. A system as claimed in claim 2 wherein:

said light means (14) includes a plurality of electric lamps (14) mounted in a housing (12) behind a display panel (13) operable to back-light said panel (13); and said solar cell array (17) includes a plurality of solar cell modules (16) mounted on said housing (12) and electrically interconnected to generate electricity to operate said lamps (14).

17. A system as claimed in claim 3 wherein;

said light means (14) includes a plurality of electric lamps (14) mounted in a housing (12) behind a display panel (13) operable to back-light said panel (13); and said solar cell array (17) includes a plurality of solar cell modules (16) mounted on said housing (12) and electrically interconnected to generate electricity to operate said lamps (14).

18. A system as claimed in claim 4 wherein;

said light means (14) includes a plurality of electric lamps (14) mounted in a housing (12) behind a display panel (13) operable to back-light said panel (13); and said solar cell array (17) includes a plurality of solar cell modules (16) mounted on said housing (12) and electrically interconnected to generate electricity to operate said lamps (14).

* * * * *

REEXAMINATION CERTIFICATE (1435th)

United States Patent [19] [11] B1 4,484,104

O'Brien [45] Certificate Issued Mar. 19, 1991

[54] SOLAR-POWERED LIGHTING SYSTEM

[75] Inventor: Peter O'Brien, Southport, Australia

[73] Assignee: Solarmark Itl, Crows Nest, Australia

Reexamination Request:
No. 90/001,852, Sep. 29, 1989

Reexamination Certificate for:
Patent No.: 4,484,104
Issued: Nov. 20, 1984
Appl. No.: 387,837
Filed: Oct. 6, 1980

[22] PCT Filed: Oct. 6, 1980

[86] PCT No.: PCT/AU80/00075
§ 371 Date: Jun. 1, 1982
§ 102(e) Date: Jun. 1, 1982

[87] PCT Pub. No.: WO82/01270
PCT Pub. Date: Apr. 15, 1982

[51] Int. Cl.[5] .......... H05B 37/00
[52] U.S. Cl. .......... 315/86; 315/149; 315/307; 136/291; 362/812
[58] Field of Search .......... 315/86, 149, 307, 311; 136/291; 362/234, 812

[56] References Cited

U.S. PATENT DOCUMENTS

| | | | |
|---|---|---|---|
| 3,356,891 | 12/1967 | Godard | 315/86 |
| 3,486,068 | 12/1969 | Dunn et al. | 315/86 |
| 3,629,600 | 12/1971 | Stuler | 307/66 |
| 3,683,198 | 8/1972 | Thode | 307/66 |
| 3,739,226 | 6/1973 | Seiter et al. | 315/86 |
| 3,833,817 | 9/1974 | Patel | 315/86 X |
| 4,117,373 | 9/1978 | Alley | 315/86 |
| 4,144,462 | 3/1979 | Sieron et al. | 315/86 X |
| 4,167,680 | 9/1979 | Gross | 307/66 |
| 4,216,410 | 8/1980 | Feldstein | 315/86 |
| 4,297,614 | 10/1981 | Chandler | 315/86 |
| 4,314,198 | 2/1982 | Rogers | 315/311 |
| 4,323,820 | 4/1982 | Teich | 315/86 |
| 4,384,317 | 5/1983 | Stackpole | 362/234 |

FOREIGN PATENT DOCUMENTS

| | | | |
|---|---|---|---|
| 848007 | 7/1970 | Canada | 315/86 |
| 115096 | 9/1979 | Japan | 315/86 |

*Primary Examiner*—Eugene R. LaRoche

[57] ABSTRACT

A solar-powered lighting system suitable for signs or hoardings (10), navigation beacons or as an emergency supply for hotels, cinemas, hospitals or other services.

The system incorporates solar cell arrays (17) which generate electricity which is stored in batteries (22). A sensing circuit (14) selectively connects the batteries (22) to lights (14). A timing/switching circuit (32), (32a) may be provided to selectively connect the lights (14) to a mains supply (30).

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *